United States Patent
Sorenson

[15] 3,688,797
[45] Sept. 5, 1972

[54] CARTRIDGE TYPE VALVE
[72] Inventor: Gerald T. Sorenson, Hartland, Wis.
[73] Assignee: Systems Design Company, Inc., Milwaukee, Wis.
[22] Filed: May 1, 1970
[21] Appl. No.: 33,663

[52] U.S. Cl. .............................................137/625.64
[51] Int. Cl. .........................F16k 11/07, F16k 31/06
[58] Field of Search....137/559, 625.64, 625.66, 625.69

[56] References Cited
UNITED STATES PATENTS
3,559,687  2/1971  Aslan....................137/625.69
3,542,073  11/1970  Holbrook..............137/625.66
3,398,764  8/1968  Herion...............137/625.64 X
3,038,495  6/1962  Fortin.......................137/559

Primary Examiner—Henry T. Klinksiek
Attorney—John J. Byrne

[57] ABSTRACT

A valve assembly wherein a valve cartridge, having honed valve surfaces in which a lapped valve spool is reciprocated, is supported in a housing by means isolating these surfaces from stresses due to bolt torques and other stresses to which the assembly is subjected.

16 Claims, 8 Drawing Figures

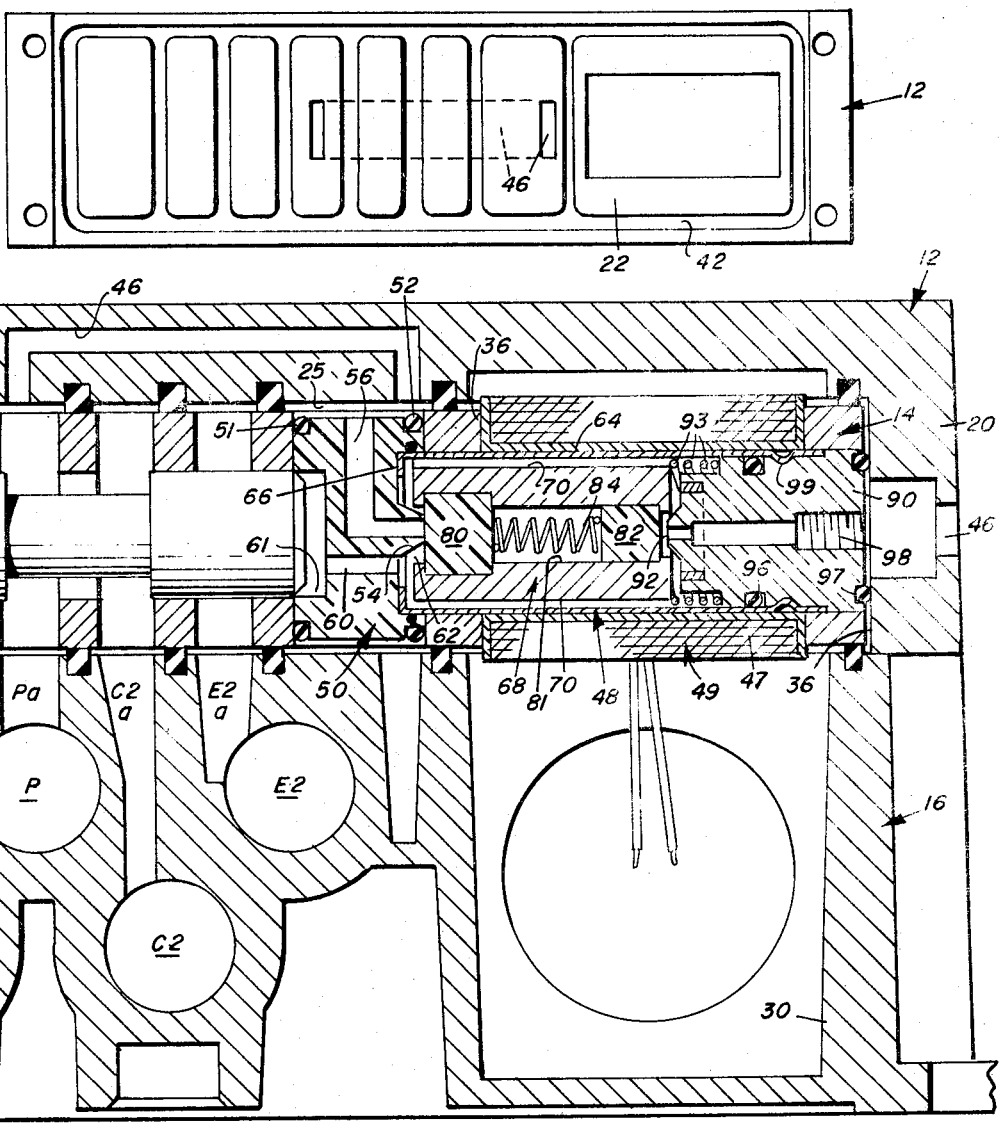
FIG.2
FIG.3a
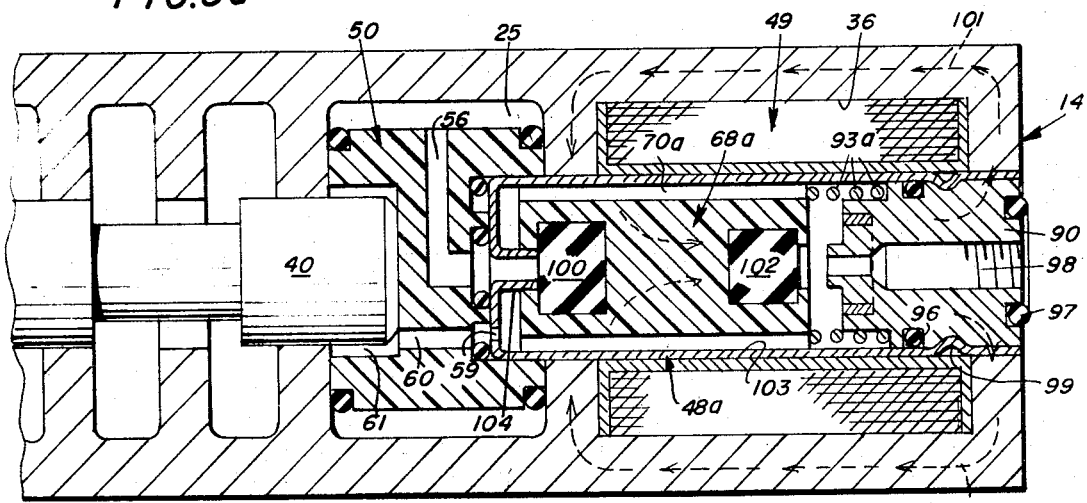
FIG.3b

CARTRIDGE TYPE VALVE

A principal objective of this invention is to isolate a valve cartridge from its supporting members by resilient members which reduce the possibility of distortion in the valve cartridge.

Another objective of this invention is to provide a valve assembly having flow-through passageways of large capacity resulting in efficient spool valving actions which increase flow capacity of the assembly without substantially increasing over-all dimension requirements.

A further objective of this invention is to provide a readily replaceable valve cartridge wherein outside surfaces of the valve cartridge also comprise outside surfaces of a valve assembly.

A still further objective of this invention is to provide a valve assembly wherein a valve cartridge is removable and replaceable.

Another objective of this invention is to provide a valve cartridge wherein the walls thereof have substantially equal cross-sections providing uniform heat flow characteristics thereby reducing the possibility of unequal heating in different areas of the valve. This objective is accomplished by a construction wherein all cross-sections perpendicular to the longitudinal axis of said cartridge are symmetrical; all cross-sections parallel to any of its sides and including the longitudinal axis are symmetrical and all other cross-sections which include said longitudinal axis are asymmetrical.

Another important objective of the invention is to provide a valve assembly having desirable and simple geometric shapes which permit economical manufacture and assembly.

Another principal objective of the invention is to provide a valve cartridge having an integral solenoid flux path which not only results in economic advantages but also provides greater electrical efficiency.

Another important objective of the invention is to provide a valve assembly readily adaptable to designs incorporating pilot operated, single solenoid and double solenoid embodiments.

A still further objective of the invention is to provide a valve assembly wherein the assembly provides for shock-absorbing characteristics.

Another important objective of the invention is to secure a valve cartridge to a subplate wherein the cartridge is not subjected to unbalanced forces due to fluid pressure.

A further objective of this invention is to secure a valve cartridge to a subplate wherein the cartridge is not subjected to unbalanced fluid forces tending to lift said cartridge from said subplate.

A further objective of this invention is to provide a solenoid pilot operated valve wherein a solenoid pilot valve is in the form of a replaceable cartridge.

These and other objects of the invention will become more apparent to those skilled in the art by reference to the following detailed description when viewed in light of the accompanying drawings wherein:

FIG. 2 is a view of the inner surface of the cover member of FIG. 2;

FIG. 3a is a partial assembled vertical cross-section of the valve of FIG. 1;

FIG. 3b is a partial assembled horizontal cross-section of the valve of FIG. 1 having a variation in the solenoid member;

Figure 1:
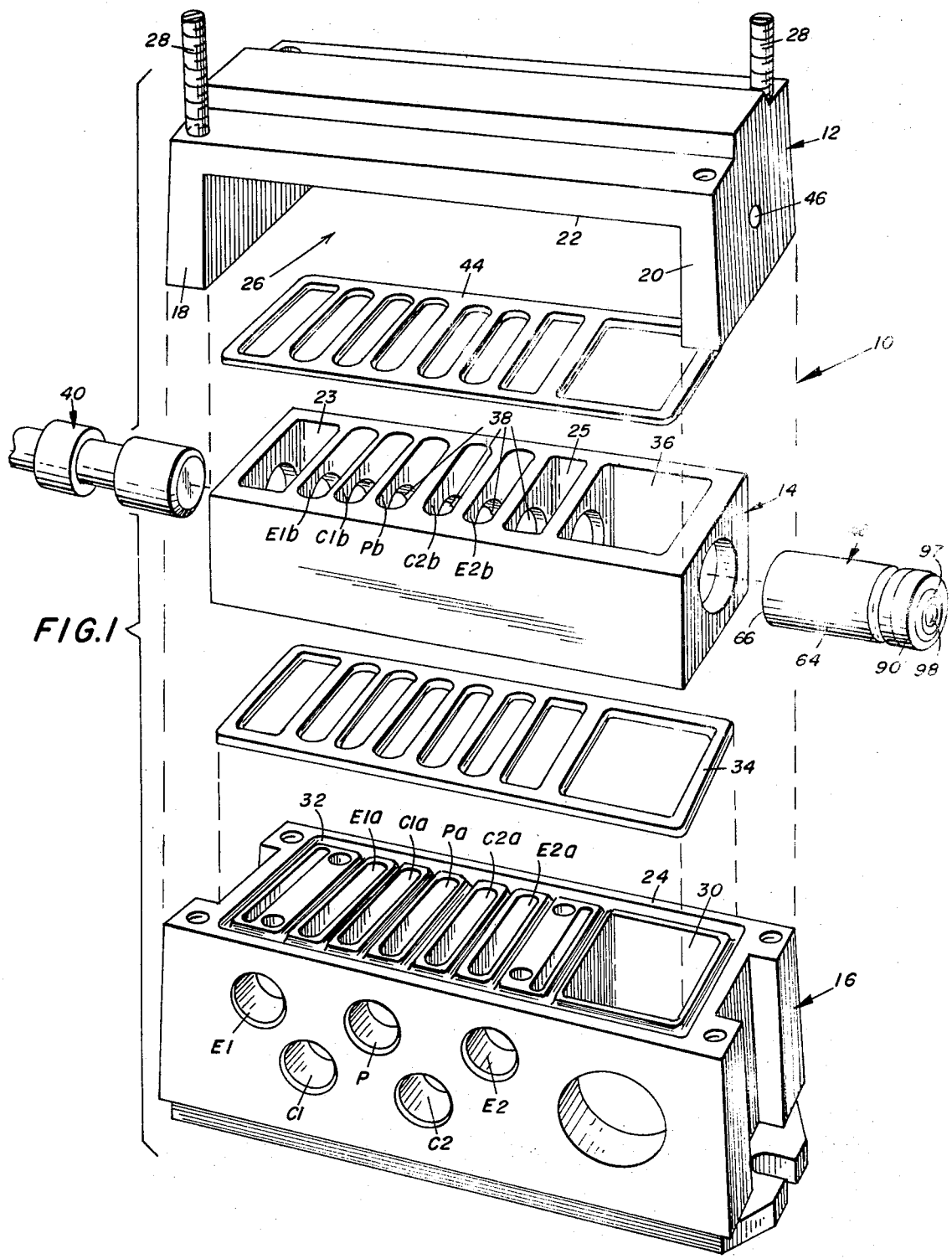
FIG. 1 is an exploded view of a single solenoid valve incorporating features of this invention.

Referring now to the drawings wherein like elements are indicated by like numerals, the numeral 10 indicates a single solenoid embodiment of this invention. There are three major components to the valve assembly; namely, cover 12, cartridge 14, and the subplate 16. Legs 18 and 20 extend downwardly from cover 12 and define therebetween an interior surface of the cover as designated by the numeral 22. The surface 22, legs 18 and 20 and top surface 24 of subplate 16 form an open-sided chamber 26 which receives cartridge 14. The cover is secured to the subplate 16 by way of elongated bolt means 28.

The subplate 16 has inlet and outlet ports for the delivery of fluid to and from the valve assembly. For purposes of description, these ports are identified as C1, C2, P, E1 and E2. These ports are communicated to the upper surface 24 by passageways at C1a, C2a, Pa, E1a and E2a. The subplate also includes a cavity 30 for the reception of an electrical power source. The power source can be a series of electrical leads or a plug-in receptacle as known to those skilled in the art. Formed in the surface 24 about each of passageway outlets is a sealing groove 32 for the reception of a resilient sealing member 34.

The cartridge 14 is of a material having ferromagnetic properties and is formed with a plurality of elongates ports C1b, C2b, Pb, E1b and E2b, in communication with the corresponding elongated outlets of the passageways in the subplate. A pair of cavities 23 and 25 are respectively located at either end of the port grouping. The valve cartridge is also formed with a solenoid cavity 36 situated over the cavity 30 of the subplate. Cartridge 14 has a bore 38 extending longitudinally therethrough intersecting the port members at right angles. The bore 38 carries the valve spool or operating member 40. The inner surface 22 of cover 12 is shown in FIG. 2. A groove 43 is formed therein to receive the resilient sealing member 44. The sealing members 34 and 44, although shown with square cross-sections, work well with circular cross-sections and, as will be later understood, resiliently support the cartridge within the chamber 26. The cover 12 is also formed with the pilot pressure passageway 46. Operation of the single solenoid system can best be understood by referring to the assembly drawings of FIG. 3a and 3b.

Disposed within cavity 36 is a solenoid assembly 46 which is connected to the electric power source in cavity 30 of the subplate. The solenoid assembly is comprised of a coil 47 having a central opening in which a solenoid cartridge assembly 48 is inserted. A plastic seat member 50 is inserted into chamber 25. Seat member 50 is seated against the walls of the chamber by a pair of O-rings 51 and 52. On its surface facing assembly 48, the seat is formed with a projection 54. A passageway 56 leading to the periphery of seat member 50 communicates the projection to the pilot pressure in chamber 25. The pilot pressure is received by chamber 25 through the passageway 46 in cover 12. The plastic seat member 50 is formed with a vent 60 for communicating the pilot pressure in cavity 25 to a counterbore 61. The seat 61 is adapted to receive the end of spool 40.

The cartridge 48 is enclosed by a tubular casing 64. The casing is formed with an inwardly directed flange 66 at the inner end thereof. Inserted into the casing 64 is an armature or plunger member 68 having slots 70 about its outer periphery. The armature 68 has an interior passageway 81 which receives resilient pads 80 and 82 at either end thereof. The pads 80 and 82 can be of rubber or other elastomeric materials and are connected by a resilient member 84. Member 84 permits the pad 82 to move longitudinally with respect to pad 80. Disposed in the outer end of casing 64 is a pole piece 90 having a seat opening 92 disposed opposite pad 82. Between the armature 68 and the pole piece 90 is a spring 93 which normally biases the armature to the left as seen in FIGS. 3a and 3b. The pole piece 90 is sealed within the casing by way of O-ring 96 and is crimped in place at 99 with respect to the casing. The pole piece is formed with a longitudinal passageway 98 for communicating the passageways 70 to atmospheric pressure when pad 82 is not blocking it. Resilient O-ring member 97 serves as a shock absorber or isolator between the cartridge assembly and the leg 20. A similar O-ring is disposed between the other end of cartridge 14 and leg 18.

As can be seen in FIG. 3a, the pilot passageway 46 takes a pressure from P and communicates it to chamber 25. When the solenoid is not energized, spring 93 holds the armature to the left and the spool 40 is held to the right by way of a spring (not shown but similar to spring 41 shown in FIG. 4) at the other spool end. Upon energization of the solenoid, a flux path (see arrows 101, FIG. 3b) is set up in the walls of cartridge 14 defining cavity 36. The plunger or armature 68 is drawn to the right permitting the pilot pressure to enter a chamber 62. The pilot pressure is then vented through vent 60 to urge the spool 40 to the left against its spring bias. As plunger 68 moves to the right, pad 82 seats against pole piece 90. Thus, passageway 98 is closed and pilot pressure cannot escape to the atmosphere.

When de-energized, the plunger moves to the left and seat 80 engages projection 54 and blocks passageway 56. The pilot pressure in chamber 62 finds its way to passageway 98 through the grooves 70 about the periphery of the plunger. Thus, movement of plunger 68 to the right is effective to move the spool 40 to the left. Movement of the spool will distribute pressures to C1 or C2 in the manner well known to those skilled in the valving arts.

A second variation of a solenoid is shown in FIG. 3b. Here, the armature 68a does not have an interior passageway but includes a pair of end pockets to receive resilient pads 100 and 102. Again, the plunger is formed with the exterior slots 70a covered by the casing 103. An inwardly directed flange 104 engages the elastomeric pad 102. Operation of the FIG. 3b embodiment is generally the same as that of the cartridge of FIG. 3a. Upon energization of the coil, plunger 68a is drawn to the right and pad 102 closes passageway 98. Simultaneously, pad 100 uncovers the tube of flange 104 and pilot pressure is transmitted to chamber 61 through vents 59 and 60. In this manner, the cartridge now contains the pressure seat. This has the advantage that upon replacement of a cartridge, a completely new pilot valve is inserted.

Figure 4:
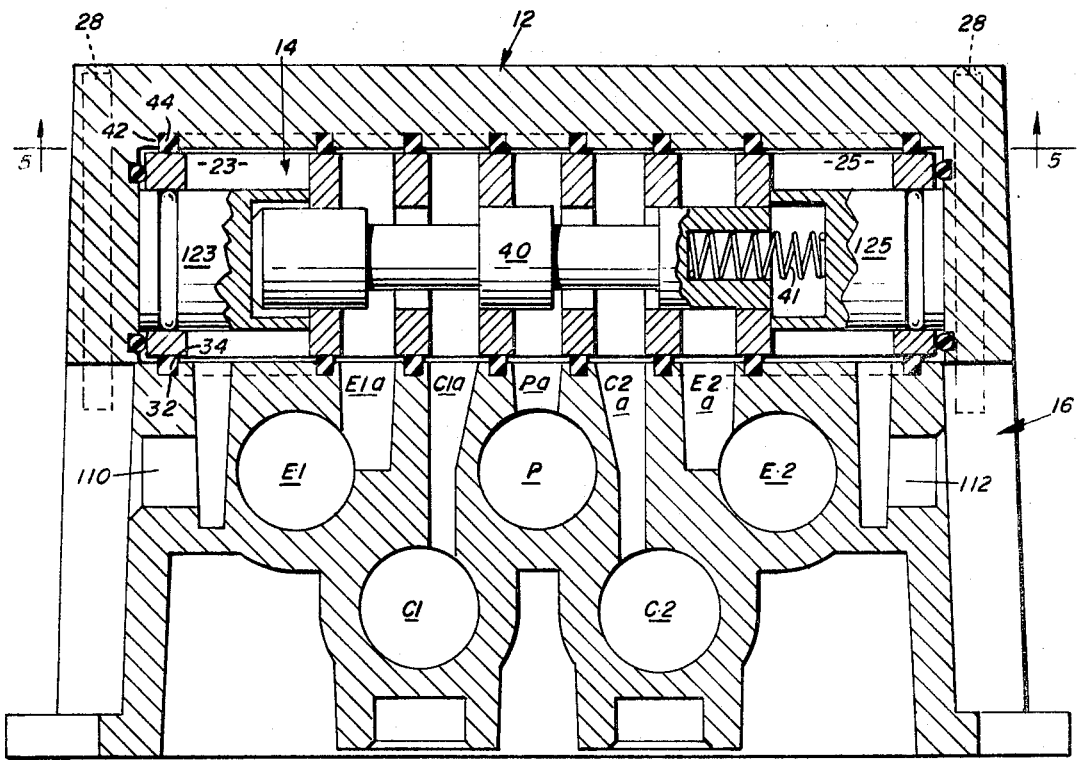
FIG. 4 is an assembled cross-section of a pilot operated embodiment incorporating the features of this invention.
Figure 5:
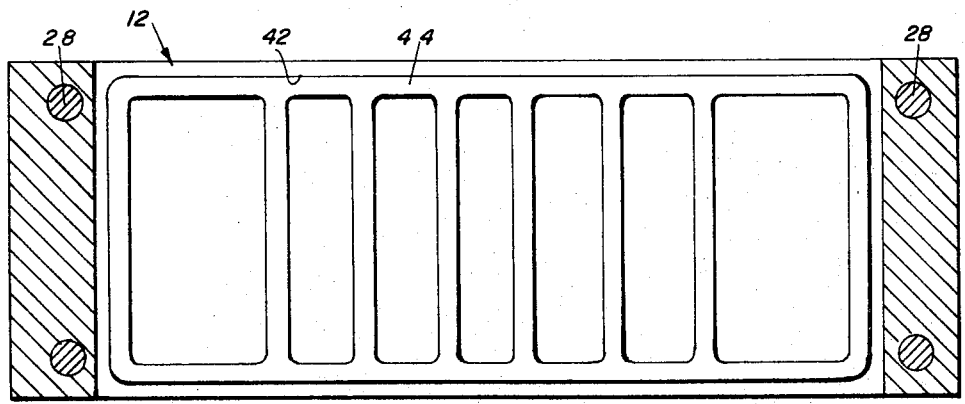
FIG. 5 is a section taken on line 5—5 of FIG. 4.

In FIG. 4 there is shown a pilot-operated valve also incorporating the principles of this invention. Here, instead of a solenoid assembly, a pair of pilot-pressure apertures or passageways 110 and 112 are communicated to the cavities 23 and 25. If desired, in this pilot-operated variation, there also can be a single pilot pressure passageway 110 with a spring in the chamber 25. Note that gaskets 34 and 44 again isolate the cartridge 14 from housing stresses which may be encountered such as torque distortions caused by the bolting members 28. Spool stop members 123 and 125 in cavities 23 and 25 limit spool travel and serve as shock absorbers.

Figure 6:
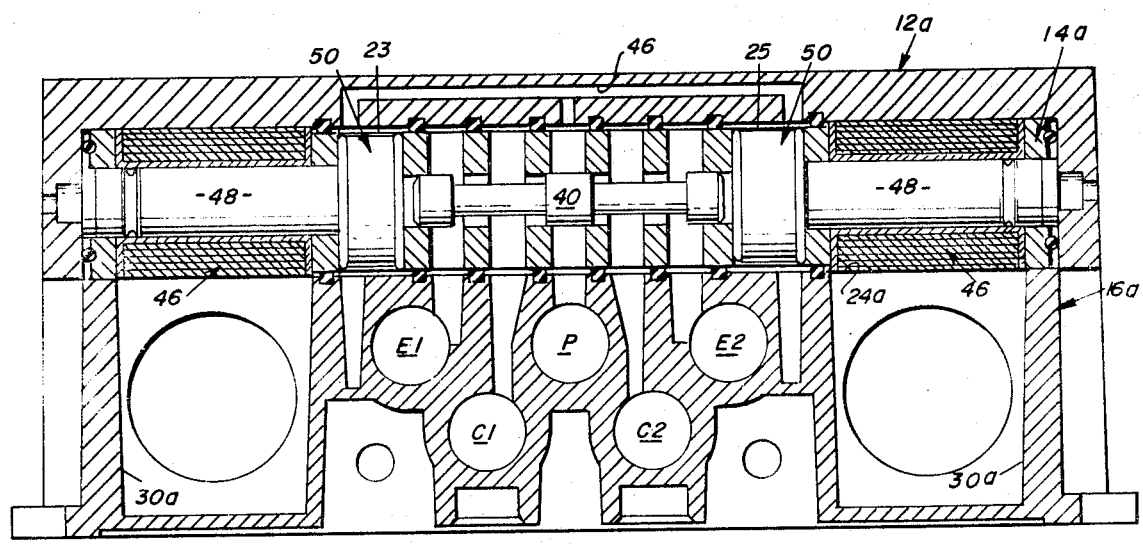
FIG. 6 is an assembled cross-section of a double solenoid variation incorporating the features of this invention.

In FIG. 6 there is shown an assembly drawing of a double solenoid valve. The operation of this valve is the same as the embodiment of FIGS. 1-3 except that a second solenoid is in lieu of a spool spring member.

There has been described above a valve assembly which floats a valve cartridge within a housing. The gaskets and seals between the cartridge and the remainder of the assembly provide this. The passageways of the valve cartridge are readily formed by known manufacturing techniques. In valves of the type described, the surfaces of the spool 40 and the bore 38 must be fit to close tolerances. Lapping and honing techniques are frequently used. Through the arrangement described, the spool and the bore surfaces are protected from distortion forces. The sealing members 34 and 44 isolate or float the cartridge in a manner to prevent housing stresses to be imparted by the fastening screw 28 or the like. It also should be noted that the cartridge itself forms two of the side walls of the housing. The dimensions of the valve cartridge passageways should also be noted. The elongated shape increases the fluid capacity of the valve in a minimum of space requirements. The walls of the cartridge passageways are of uniform dimension so as to provide a uniform dissipation of heat. Another advantage is that the cartridge and pole piece themselves provide the flux path for the solenoid coils.

Figure 7:
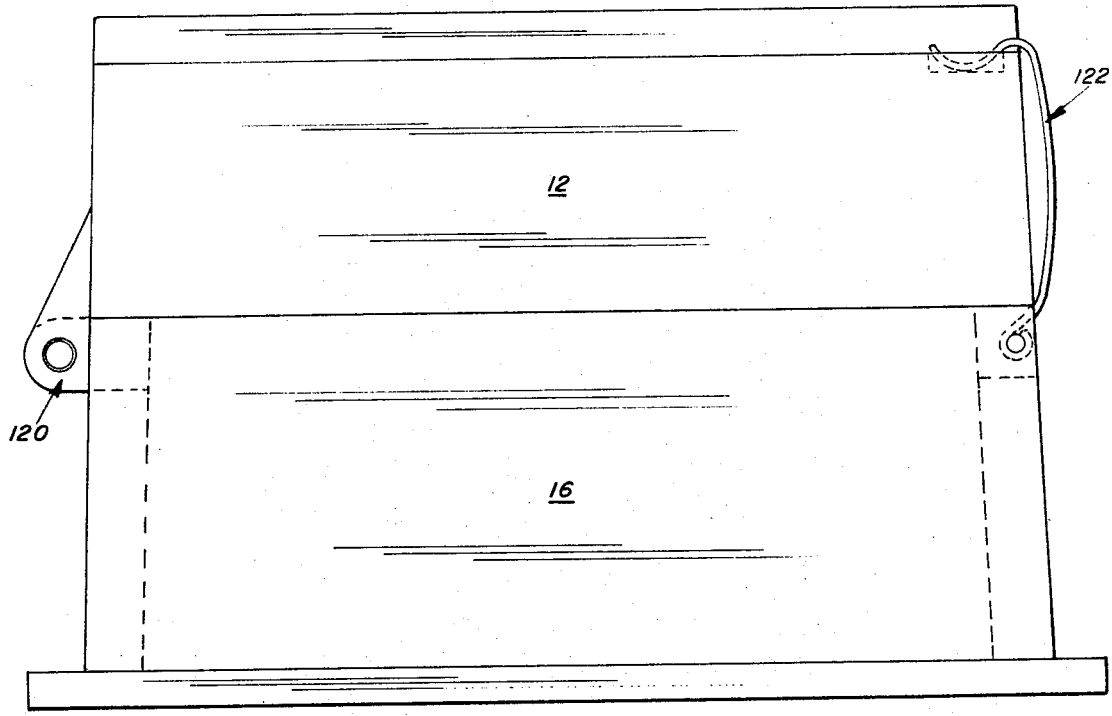
FIG. 7 is an embodiment showing a pivoted cover, spring-clip embodiment of the invention.

The invention gives rise to other advantageous variations. For instance, in FIG. 7 a means for fastening the cover to the subplate is shown. The cover is hingedly mounted to the subplate by hinge assembly 120 and the other end thereof is secured by spring clip 122. A further variation is in using a series of spring clips 122 about the cover which will eliminate the hinge assembly and such members as bolts 28. A valve cartridge can then be replaced with only a screw driver to unsnap the spring clip. Conventional spring clips such as those utilized for automobile distributor caps are particularly useful in the valve environment because of their ability to withstand continuous vibration.

In a general manner, while there have been disclosed effective and efficient embodiments of the invention, it should be well understood that the invention is not limited to such embodiments as there might be changes made in the arrangement, disposition, and form of the parts without departing from the principle of the present invention as comprehended within the scope of the accompanying claims.

I claim:

1. A valve assembly comprising
   a housing having an open-sided chamber formed by a plurality of surfaces,
   a valve plate portion of said housing having a plurality of ports leading to a first of said surfaces,
   a valve cartridge having a plurality of passageways extending therethrough and said passageways having ends in communication with said ports,
   said cartridge having a bore intersecting said passageways along an axis transverse to said passageways,
   a flow control member received in said bore for movement along said axis,
   a second surface of said chamber disposed over the other ends of said passageways and third and fourth surfaces of said chamber respectively disposed at the ends of said bore,
   and resilient means between said cartridge and said first and second surfaces of said chamber for isolating stresses in said housing from said cartridge.

2. The assembly of claim 1 wherein said resilient means include seals about the ends of said passageways.

3. The assembly of claim 2 and including second resilient means between the ends of said bore and said third and fourth surfaces, said second resilient means comprising seals about the ends of said bore.

4. The assembly of claim 1 wherein said housing includes a cover member separable from said valve plate portion and wherein said second surface is an inner surface of said cover,
   and including fastening means to secure said cover member to said valve plate portion.

5. The assembly of claim 4 wherein said fastening means are located longitudinally outboard of the ends of said cartridge.

6. The assembly of claim 4 wherein said fastening means are bolts extending through said cover into said subplate portion.

7. The assembly of claim 4 wherein said fastening means are spring clip means extending between said cover and said valve plate portion.

8. The assembly of claim 4 wherein said one end of said cover member is hingedly secured to said valve plate portion.

9. The assembly of claim 4 wherein said third and fourth surfaces are formed by downwardly depending leg portions on the ends of said cover member disposed over the ends of said bore of said cartridge.

10. The assembly of claim 1 wherein said cartridge has two surfaces forming exterior sides of said assembly at said open sides of said chamber.

11. The assembly of claim 1 wherein said first and second surfaces are substantially parallel to said axis and parallel to one another.

12. The assembly of claim 1 wherein said passageways are elongated in a direction normal to said axis and formed by walls of substantially equal thickness.

13. The assembly of claim 1 wherein said cartridge is formed with a solenoid chamber in at least one end thereof, and a solenoid is received in said chamber.

14. In a valve assembly having a spool reciprocably received in a valve cartridge of ferromagnetic properties and said cartridge having first and second chambers separated by a wall and said wall having an opening therein, the improvement comprising
    an insert in said first chamber having a counterbore receiving one end of said spool and a passageway communicating a pressure in said first chamber to a vent between said counterbore and one end of said passageway,
    a coil disposed in said second chamber having a central opening in alignment with said one end of said passageway,
    a pilot assembly in said central opening,
    said assembly comprising
    a plunger having a first seat closure at one end thereof extending through the opening of said wall and disposed opposite said passageway and,
    a second seat closure at the other end of said plunger,
    a pole piece having a second passageway leading to atmosphere and said second seat closure adapted to close said second passageway,
    a non-magnetic casing about said pole piece and plunger,
    spring means between said pole piece and said plunger biasing said plunger in a direction to urge said first seat toward said first passageway,
    a third passageway between said vent and said second passageway,
    whereby when said coil is energized, the plunger moves to close said second passageway and said pilot pressure is communicated to said counterbore through said vent.

15. The valve assembly of claim 14 wherein said cartridge provides the flux path for said coil.

16. The valve assembly of claim 14 with means to secure said pilot assembly for ready replacement.

* * * * *